Patented Nov. 23, 1948

2,454,678

UNITED STATES PATENT OFFICE 2,454,678

MIXTURE OF A POLYVINYL ACETAL WITH A DIISOCYANATE-MODIFIED POLYESTER OR POLYESTER-AMIDE

Walter Fairbairn Smith and Henry George White, Blackley, Manchester, England, assignors to Imperial Chemical Industries Limited, a corporation of Great Britain No Drawing. Application February 15, 1946, Serial No. 648,002. In Great Britain February 28, 1945

4 Claims. (Cl. 260—45.4)

This invention relates to compositions comprising polymeric materials, more particularly to compositions comprising organic diisocyanate modified polyesters or polyester-amides and acetals of polyvinyl alcohol, and to articles and other compositions made therefrom.

According to the present invention we provide compositions comprising an organic diisocyanate modified polyester or polyester-amide in uniform admixture with an acetal of polyvinyl alcohol.

The acetals of polyvinyl alcohol include the acetals of partially hydrolysed polyvinyl acetate and they are compatible with the organic diisocyanate modified polyesters or polyester-amides, in the sense that they are capable of forming homogeneous blends therewith, either alone or in the presence of a plasticiser which is mutually compatible therewith.

The proportions of the ingredients can be varied widely, but usually from about 15 to 200 parts by weight of the acetal per 100 parts of the organic diisocyanate modified polyester or polyester-amide are used.

Other ingredients can be incorporated into the compositions. These include curing agents and curing catalysts of the kind described in British specifications Nos. 13,204/41 (U. S. Serial No. 466,356, now U. S. Patent No. 2,424,883, July 29, 1947) and 7,392/42 (U. S. Serial No. 488,444, now abandoned). Alternatively, an organic diisocyanate or a mixture of organic diisocyanates, for example, of the kind mentioned hereinafter, may be incorporated therein, particularly in the presence of an organic liquid which is a mutual solvent therefor; these serve for the purpose of rendering the composition more rubbery and practically non-thermoplastic.

The organic diisocyanate modified polyester or polyester-amide may be brought into uniform admixture with the acetal in a number of ways. For instance, the components may be mixed or milled together as such or in the presence of organic liquids, for example ethylene dichloride, which are solvents for one or more materials; the organic liquids may be removed as and when convenient. Alternatively, solutions of the components may be mixed together.

As well as those already mentioned, one or more additional compounding ingredients may also be incorporated into the compositions. These also include fillers, for example, carbon black, iron oxide, clay, asbestos, blanc fixe, whiting, lithopone and mica; resins, for example, urea-formaldehyde and phenol-formaldehyde resins; other plastic materials, for example, natural or synthetic rubbers, vulcanised vegetable oils, dark substitute, white substitute, a coumarone resin, wood rosin and pitch; detackifying agents, that is to say, materials which reduce the tendency of the mix to stick to the rolls, for example, stearic acid, paraffin wax, oleic acid, lauric acid and dibutyl ammonium oleate; plasticisers, for example tricresyl phosphate, dibutyl phthalate, butyl-phthalyl butyl glycollate, and N-alkyltoluenesulphonamides; stabilisers or anti-oxidants, for example, hydroquinone, N:N'-hexamethylene-bis-ortho-hydroxy-benzamide, N-phenyl-α-naphthylamine, N-phenyl-β-naphthylamine and α:α-bis-(2-hydroxy-3:5-dimethylphenyl)butane, as well as others commonly used in rubber technology. Small quantities of pigments, for example from 1–3% by weight, such as are customarily used in rubber technology or in the coating composition art may also be used to impart colour.

The compositions may be formed into shapes or spread or calendered on to a substrate, for example on to the surface of a fabric or on to the surface of a coated fabric. If curing agents are used, curing may be effected by heating, for example, in a mould which is preferably in a hydraulic press, or in hot air. Periods of heating varying from a few minutes to several hours at 100–150° C. are usual. If desired, to facilitate shaping or spreading, additional solvents or swelling agents may be used.

Polyester- and polyamide-forming reactants suitable for making the diisocyanate modified polyesters or polyester-amides to be used for the purposes of the present invention include glycols, for example, ethylene glycol, diethylene glycol, trimethylene glycol, pentamethylene glycol, hexamethylene glycol, dodecamethylene glycol, 1:12-octadecanediol and pentaglycol; aliphatic or aromatic aminoalcohols having at least one hydrogen atom attached to the amino nitrogen atom and preferably containing an aliphatic chain of at least two carbon atoms separating the amino and hydroxyl groups, for example β-ethanolamine and 3-aminopropanol; dibasic carboxylic acids or ester-forming derivatives thereof, preferably aliphatic dicarboxylic acids, for example, malonic, succinic, glutaric, adipic, β-methyladipic, pimelic, suberic, azelaic, sebacic, undecanedioic, brassylic, isophthalic, hexahydroterephthalic, p-phenylene-diacetic, and acetone-dicarboxylic acids; primary and secondary diamines, for example, ethylenediamine, hexamethylenediamine, 3-methylhexamethylenediamine, decamethylenediamine, m-phenylenediamine, N:N'-dimethylhexamethylenediamine, N:N'-diethylhexamethylenediamine and N:N'-dimethyldecamethylenediamine; monohydroxymonocarboxylic acids or their ester-forming derivatives, for example, glycollic, 6-hydroxycaproic, 10-hydroxydecanoic and 12-hydroxy-stearic acids; polymerizable monoamino-monocarboxylic acids or their ester-forming derivatives, for example, 6-aminocaproic acid or its lactam, caprolactam, and 9-aminononanoic, 11-aminoundecanoic and 12-aminostearic acids.

The polyesters or polyester-amides are made in known manner by heating the selected reactants at polymerizing temperatures, usually in the absence of air or oxygen, under conditions whereby water is removed from the reaction mixture. When a diamine is to be used, it is conveniently used in the form of the corresponding diammonium salt from some of the dibasic carboxylic acid to be used.

The polyesters or polyester-amides are modified with organic diisocyanates in known manner for example, by mixing them, for example by stirring, milling or kneading, with the organic diisocyanate and then heating the mixture, for example, to a temperature of 100–200° C. for a period of 10–720 minutes. Up to about 10 percent, usually 3–7%, by weight of the diisocyanate is used.

Examples of organic diisocyanates include ethylene diisocyanate, trimethylene diisocyanate, tetramethylene diisocyanate, hexamethylene diisocyanate, decamethylene diisocyanate, p-phenylene diisocyanate, m-phenylene diisocyanate, p:p'-diphenyl diisocyanate, diphenylmethane-4:4'-diisocyanate, naphthalene diisocyanates and adipyl diisocyanate.

The compositions of the invention may be used in the fabrication of a variety of articles, in which they may or may not be supported on a substrate and/or interspersed with fillers. For instance, they may be used in the construction of organic liquid resistant articles of all kinds, for example, gaskets, packings, hose, diaphragms for pumps and the like, as well as in the fabrication of flexible containers. They may also be used in the coating of rollers, blankets and stereos for use in the printing industry, or to provide protective sheathings for insulated electric cables and other electrical conductors. They also find application in the coating of balls for games, tires and flexible materials generally, including fabrics, protective clothing, leather cloth and floor coverings, and generally in the construction of articles requiring the use of a material having physical properties resembling those of rubber, but also having a good resistance to the action of organic fluids and a low permeability to gases and vapours.

They are well adapted for application in the form of lacquers or finishing compositions for all kinds of surfaces. They may be formed into films or sheets, for example, as substitutes for leather or as wrapping films, and they may be used as adhesives for a wide variety of materials, for example, wood, metals, fabrics, paper, leather and regenerated cellulose.

The invention is illustrated but not limited by the following examples, in which the parts and percentages are expressed by weight, unless otherwise stated:

*Example 1*

100 parts of polyvinyl formal which is commercially obtainable under the brand name of "Formvar" are added to 50 parts of an organic diisocyanate modified polyester-amide running on a warm (50° C.) rubber mill and the temperature of the rolls is then raised to 120–130° C. The mix becomes soft and, at first, usually sticks to both of the rolls; after a few minutes, the mix becomes tough and translucent, and runs on one roll only; at this stage a small amount of formaldehyde is evolved from the mix. Milling is continued until the mix is homogeneous.

The mix is rubbery and tough when hot, and hard and somewhat brittle when cold.

The mix is formed into a composition, which can be extruded into shapes, by milling in the following ingredients:

| | Parts |
|---|---|
| Organic diisocyanate modified polyester-amide | 16.7 |
| Titanium dioxide | 0.8 |
| Pigment | 167 |

When extruded at about 100–110° C. this composition gave hard, tough, flexible tubing. Due to the high temperature which obtains during milling, it is difficult to incorporate curing agents of the formaldehyde-liberating type into the mixes of the present example.

*Example 2*

This example illustrates the formulation of a mix which can be satisfactorily cured with a formaldehyde-liberating agent in the presence of a material which develops acidity under curing conditions.

The following ingredients are milled together in the order given:

| | Parts |
|---|---|
| Organic diisocyanate modified polyester-amide blended with polyvinyl formal (50:100) obtained as described in Example 1 | 45 |
| Organic diisocyanate modified polyester-amide | 55 |
| Hexamethylolmelamine hexamethyl ether | 5 |
| 2:4-dichloro-1-naphthol | 0.75 |

The mix is formed into sheets and cured by heating under pressure in a mould at 141° C. for 35 minutes followed by heating in air at 125° C. for 2 hours. A tough, flexible sheet is obtained.

*Example 3*

This example illustrates the formulation of a liquid composition.

The following ingredients are mixed together in the order stated no attempt being made to ensure complete homogeneity:

| | Parts |
|---|---|
| Organic diisocyanate modified polyester-amide | 60 |
| Polyvinyl formal | 40 |
| Titanium dioxide | 5 |
| Pigment | 1–2 |
| Hexamethylolmelamine hexamethyl ether | 3.0 |
| 2:4-dichloro-1-naphthol | 0.45 |

The mix is treated with 100 parts of ethylene dichloride, which is a solvent for the organic ingredients present, and a viscous liquid is obtained.

This liquid may be used as a lacquer or to form spreadings on fabrics; curing may be effected by heating the coatings or spreadings in air at 125° C. for about 2 hours. Coated fabrics with outstanding flex and scrub resistance are obtained.

*Example 4*

This example illustrates the formulation of compositions in which an organic diisocyanate is used to reduce thermoplasticity.

Solutions are made of the following ingredients:

|  | A | B |
|---|---|---|
|  | Parts | Parts |
| Organic diisocyanate modified polyester-amide | 6 | 2 |
| Polyvinyl formal | 4 | 8 |
| Ethylene dichloride | 90 | 90 |

To each of these solutions there is added immediately before use 1.5 parts of diphenylmethane-4:4'-diisocyanate. The solutions are flowed on to glass plate, the solvent is allowed to evaporate, and the so obtained films are allowed to stand at room temperature for some time.

The film from solution A is clear, soft, and rubbery, and has a good tear resistance and little thermoplasticity.

The film from solution B is clear, hard, durable, flexible and not thermoplastic even at 150° C.

The solutions are of value as lacquers, for example, in leather coating and finishing.

The organic diisocyanate modified polyester-amide used in the above examples is that described in Example 7 of British specification No. 13,204/41 (U. S. Serial No. 466,356, now U. S. Patent 2,424,883, July 29, 1947), and is obtained as follows:

127.75 parts of adipic acid, 42.25 parts of ethylene glycol and 13.6 parts of monoethanolamine are heated together under carbon dioxide to 190° C. during seventeen hours and the mixture is then subjected to continuous azeotropic distillation with xylene at 180–190° C. for twenty-two hours. Most of the xylene is then removed by distillation at 185° C. A pale yellow syrup with a melt viscosity of 68 poises at 75° C. and an acid value of 9.6 mgm. KOH per gm. is obtained. This syrup slowly hardens to a soft, cream-colored wax.

This wax is treated in a steam heated internal mixer at 145° C. with 4–5% of hexamethylene diisocyanate (added in three portions at fifteen minute intervals). The so obtained diisocyanate modified polyester-amide is a soft, rubber-like material which does not harden on standing.

We claim:

1. A product comprising 15 to 200 parts of polyvinyl formal and 100 parts of a reaction product of a hydrocarbon diisocyanate and a linear polymer selected from the class consisting of polyesters containing recurring intralinear carboxylic ester groups and polyester-amides containing recurring intralinear carboxylic ester groups and recurring intralinear carbonamide groups, the ratio of said ester groups to said carbonamide groups being at least 1:1.

2. The heat-cured product of claim 1.

3. A heat-cured product of a mixture comprising 15 to 200 parts of polyvinyl formal, a formaldehyde-liberating substance, a catalyst which is acidic under curing conditions and 100 parts of a reaction product of a hydrocarbon diisocyanate and a linear polymer selected from the class consisting of polyesters containing recurring intralinear carboxylic ester groups and polyester-amides containing recurring intralinear carboxylic ester groups and recurring intralinear carbonamide groups, the ratio of said ester to said carbonamide groups being at least 1:1.

4. A process for manufacturing compositions for finishes and the like which comprises forming blends of 15 to 200 parts of polyvinyl formal and 100 parts of a reaction product of a hydrocarbon diisocyanate and a linear polymer selected from the class consisting of polyesters containing recurring intralinear carboxylic ester groups and polyesteramides containing recurring intralinear carboxylic ester groups and recurring intralinear carbonamide groups, the ratio of said ester groups to said carbonamide groups being at least 1:1 and heating the said blends at a temperature of about 100° C. to about 150° C. whereby to effect curing.

WALTER FAIRBAIRN SMITH.
HENRY GEORGE WHITE.

REFERENCES CITED

The following references are of record in the file of this patent:

UNITED STATES PATENTS

| Number | Name | Date |
|---|---|---|
| 2,275,008 | Coffman | Mar. 3, 1942 |
| 2,277,083 | Dorough | Mar. 24, 1942 |
| 2,333,917 | Christ et al. | Nov. 9, 1943 |